United States Patent
Liu

(10) Patent No.: US 9,225,246 B2
(45) Date of Patent: Dec. 29, 2015

(54) DC-DC BUCK CIRCUIT

(71) Applicant: Yu Ye Liu, Shenzhen (CN)

(72) Inventor: Yu Ye Liu, Shenzhen (CN)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 14/166,010

(22) Filed: Jan. 28, 2014

(65) Prior Publication Data
US 2014/0210443 A1 Jul. 31, 2014

(30) Foreign Application Priority Data
Jan. 28, 2013 (CN) .......................... 2013 1 0032346

(51) Int. Cl.
*H02M 3/156* (2006.01)
*H02M 3/158* (2006.01)

(52) U.S. Cl.
CPC ............ *H02M 3/158* (2013.01); *Y02B 70/1466* (2013.01)

(58) Field of Classification Search
CPC ... H02M 3/156; H02M 3/157; H02M 3/1588; H02M 3/1584; H02M 2001/0045; G05F 1/56; G05F 1/59
USPC .......................... 323/268, 269, 282–285, 351
See application file for complete search history.

(56) References Cited

U.S. PATENT DOCUMENTS

| | | | |
|---|---|---|---|
| 8,680,895 B2* | 3/2014 | Carpenter et al. ............ | 327/109 |
| 2009/0322296 A1* | 12/2009 | Li et al. .......................... | 323/282 |
| 2010/0033237 A1* | 2/2010 | Liang et al. ................... | 327/543 |
| 2013/0169262 A1* | 7/2013 | Hartman ....................... | 323/351 |

* cited by examiner

*Primary Examiner* — Adolf Berhane
(74) *Attorney, Agent, or Firm* — Schiff Hardin LLP

(57) ABSTRACT

A DC-DC Buck circuit has a DC input terminal, a DC output terminal, a ground terminal, an inductor, a capacitor, a sampling resistor, a PWM control chip and a DrMOS chip. The output of the driver pin of the PWM control chip is unrelated to the voltage between the inductor and the sampling resistor. The DC-DC Buck circuit can produce a larger output voltage while also being compatible with a DrMOS chip.

7 Claims, 5 Drawing Sheets

DC-DC BUCK CIRCUIT

BACKGROUND OF THE INVENTION

1. Field of the Invention

The present invention relates overall to the technical field of direct current to direct current (DC-DC) power supplies, and more particularly to a DC-DC Buck circuit.

2. Description of the Prior Art

DC-DC conversion technology is currently widely used in fields such as household electrical appliances, digital products, and aeronautics and astronautics, with an ever increasing number of applications requiring the use of DC-DC power supply modules. A DC-DC Buck circuit is a circuit which makes the output voltage lower than the input voltage by switching or linear step-down, with both the input and the output being DC. There are two types of DC-DC Buck circuit, non-synchronous (asynchronous) and synchronous.

FIG. 1 shows a diagram of a typical asynchronous DC-DC Buck circuit, which includes a switch S, inductor L, flyback diode VD, load $R_{load}$ and capacitor C. When the switch S is conducting, the input voltage supplies power to the load $R_{load}$ via the inductance L, at the same time charging the capacitor C; during this process, the capacitor C and inductor L store energy. When the switch S is opened, the inductor L, load $R_{load}$ and flyback diode VD form a loop, and the energy stored in the inductor L continues to supply power to the load $R_{load}$; when the output voltage is about to fall, the energy in the capacitor C also discharges into the load $R_{load}$, to maintain a constant output voltage.

FIG. 2 shows a conventional synchronous DC-DC Buck circuit, in which an upper tube switch G1 is used for establishing or stopping conduction between a DC input terminal 6 and an inductor L, and a lower tube switch G2 is used for flyback current when the inductor L and DC input terminal 6 are isolated from each other. The Buck circuit has a first type of PWM control chip 10, for example an LTC3855 produced by Linear, or a TPS40140 produced by Texas Instruments, wherein only some of the pins are shown. The first type of PWM control chip 10 acts in cooperation with 5 external sub-circuits (indicated by the dotted line boxes in FIG. 2) to drive the opening and closing of discrete external switches. The chip comprises an upper tube driver HG and a lower tube driver LG, wherein the upper tube driver HG is used to switch the upper tube switch G1 on or off, and the lower tube driver LG is used to switch the lower tube switch G2 on or off; there is a 180-degree phase difference between the upper tube driver HG and the lower tube driver LG. The upper tube driver HG and lower tube driver LG of the first type of PWM control chip 10 are used to produce a PWM control signal; drive circuits in the first sub-circuit 1 and second sub-circuit 2 in FIG. 2 drive the upper tube switch G1 and the lower tube switch G2 alternately according to the PWM control signal of the first type of PWM control chip 10. As shown in FIG. 2, and as is well known to those skilled in the art, in order to enable the upper tube driver to drive the upper tube switch in a floating manner, the first type of PWM control chip 10 must be provided with a BOOT pin for a bootstrap power supply terminal and an SW pin for an upper tube drive signal loop. The Boot and SW pins of the upper tube driver HG cooperate with the drive circuit of the fifth sub-circuit 5, and are used to supply power to the drive circuit of the upper tube switch G1, so that when the gate voltage of the upper tube switch G1 is higher than the source voltage and greater than the switch-on voltage $V_{GS(TH)}$, the upper tube switch G1 can conduct well. The circuit also comprises noise reduction circuits of third and fourth sub-circuits 3 and 4, used to suppress switching noise in the upper tube switch G1 and lower tube switch G2. The Buck circuit also has a sampling resistance 9. The first type of PWM control chip 10 also has an FB pin for monitoring output voltage, and CSP/CSN (positive current sampling/negative current sampling) pins connected to the sampling resistance 9, for adjusting the output voltage of the Buck circuit according to feedback voltage and feedback current. The CSP pin is connected to the positive pole of the sampling resistance 9, while the CSN pin is connected to the negative pole of the sampling resistance 9, for the purpose of monitoring the voltage across the sampling resistance 9; moreover, feedback current can be obtained on the basis of the sampling resistance 9 and the potential difference across it. The first type of PWM control chip 10 imposes no restrictions in terms of level on the CSP, so the latter can receive a relatively wide range of voltages; for example, the CSP of the first type of PWM control chip can receive a voltage of 5.5 V or even higher. Although this conventional synchronous DC-DC Buck circuit can produce a relatively high output voltage, the PWM control chip 10 in the circuit is only used for compatibility with the external discrete switch (e.g. MOSFET) circuits, i.e. the above-mentioned 5 external sub-circuits must be configured, with the result that the volume of the product is quite large, and positioning of circuits is inconvenient.

To solve this problem, a DrMOS chip design has been proposed in the prior art, in which the conventional two discrete sets of switches and drive circuits for supplying power to switches are integrated in a single chip by a more advanced process, so that the system is more stable and energy-saving in operation. FIG. 3 shows a common DC-DC Buck circuit, comprising a DrMOS chip 20 consisting of an upper tube switch C1, a lower tube switch G2 and a drive circuit, as well as a second type of PWM control chip 11 (e.g. NCP5314, produced by ON Semiconductor, or L6716, produced by ST Microelectronics) for supplying a logic level to the DrMOS chip. The second type of PWM control chip 11 referred to here is a chip specially intended to cooperate with the DrMOS chip 20, and is different from the first type of PWM control chip 10 mentioned above; the first type can drive switches, whereas the second type lacks this function. The drive circuit in the DrMOS chip 20 is used for driving the upper tube switch G1 and lower tube switch G2 alternately according to the logic level supplied by the second type of PWM control chip 11. The advantage of such a DC-DC Buck circuit is that it can for example integrate two MOSFET drivers, an upper tube MOSFET and a lower tube MOSFET in a 40-pin QFN package measuring 6 mm by 6 mm or 8 mm by 8 mm, so it is more compact and efficient than the conventional circuit shown in FIG. 2. However, since the second type of PWM control chip 11 used in conjunction with the DrMOS chip 20 places level restrictions on the CSP pin, with the CSP of the second type of PWM control chip perhaps for example being at a voltage of less than 5.5 V, it is generally impossible to supply a higher output voltage; when the input is 12 V, the output voltage supplied is less than 5.5 V.

SUMMARY OF THE INVENTION

The present invention is based on research that shows the first type of PWM control chip can be used in conjunction with a DrMOS chip by suitably changing the circuit connections.

An object of the present invention is to provide a DC-DC Buck circuit, having a DC input terminal, a DC output terminal, a ground terminal, an inductor, a capacitor, a sampling resistor, a PWM control chip and a DrMOS chip. The inductor is located between the DC input terminal and the DC output terminal; the capacitor is located between the DC output terminal and the ground terminal. The sampling resistor is located between the inductor and the DC output terminal. The PWM control chip has at least one driver pin that is used to supply a PWM control signal. The DrMOS chip is located between the inductor and the DC input terminal, and is used to drive conduction between the DC output terminal and the DC input terminal, and between the DC output terminal and the capacitor, or alternately according to the PWM control signal. The DrMOS chip has a PWM pin that is used to receive the PWM control signal, wherein the output of the driver pin is unrelated to the voltage between the inductor and the sampling resistor.

In one embodiment, the PWM control chip further has a BOOT pin, for supplying a bootstrap voltage; and an SW pin, used to form a driver loop. There is a predetermined voltage difference between the BOOT pin and the SW pin.

In one embodiment, the BOOT pin is connected to a 5 V DC voltage, while the SW pin is connected to the ground terminal.

In one embodiment, the driver pin has at least one upper tube driver pin and at least one lower tube driver pin, wherein the PWM control signals supplied by the upper tube driver pin and the lower tube driver pin have opposite phases.

In a further embodiment, the upper tube driver pin is connected to the PWM pin.

In another embodiment, the lower tube driver pin is connected to the PWM pin, and the Buck circuit further comprises a phase inverter, which is connected between the lower tube driver and the PWM pin for the purpose of enabling the drive circuit to drive the upper tube switch and the lower tube switch alternately, wherein the upper tube driver no longer supplies the PWM control signal. Through this arrangement, the lower tube driver can be used to supply a PWM signal.

The present invention also provides a multiphase DC-DC Buck circuit interleaved in parallel, formed by N of the above circuits, with a phase difference of 360/N degrees between the PWM control signals output by the various PWM control circuits.

The present invention also provides a power supply allocation device, comprising the above Buck circuit, wherein the power supply allocation device is applied to a magnetic resonance imaging system.

Unlike conventional DC-DC Buck circuits which are not compatible with DrMOS chips (FIG. 2), the DC-DC Buck circuit provided by the present invention is compatible with a DrMOS chip, thereby realizing a more compact and effective circuit design. The DC-DC Buck circuit provided by the present invention can supply a larger output voltage and satisfy the requirements of a wider range of applications than existing DC-DC Buck circuits which use DrMOS chips. Thus, the present invention uses an existing chip and makes only slight modifications to the circuit, so as to achieve the beneficial effects of a compact structure and a higher output voltage.

DESCRIPTION OF THE PREFERRED EMBODIMENTS

Particular embodiments of the present invention will now be explained with reference to the accompanying drawings, so that the technical features, object and effects of the present invention may be more clearly understood.

Figure 4:
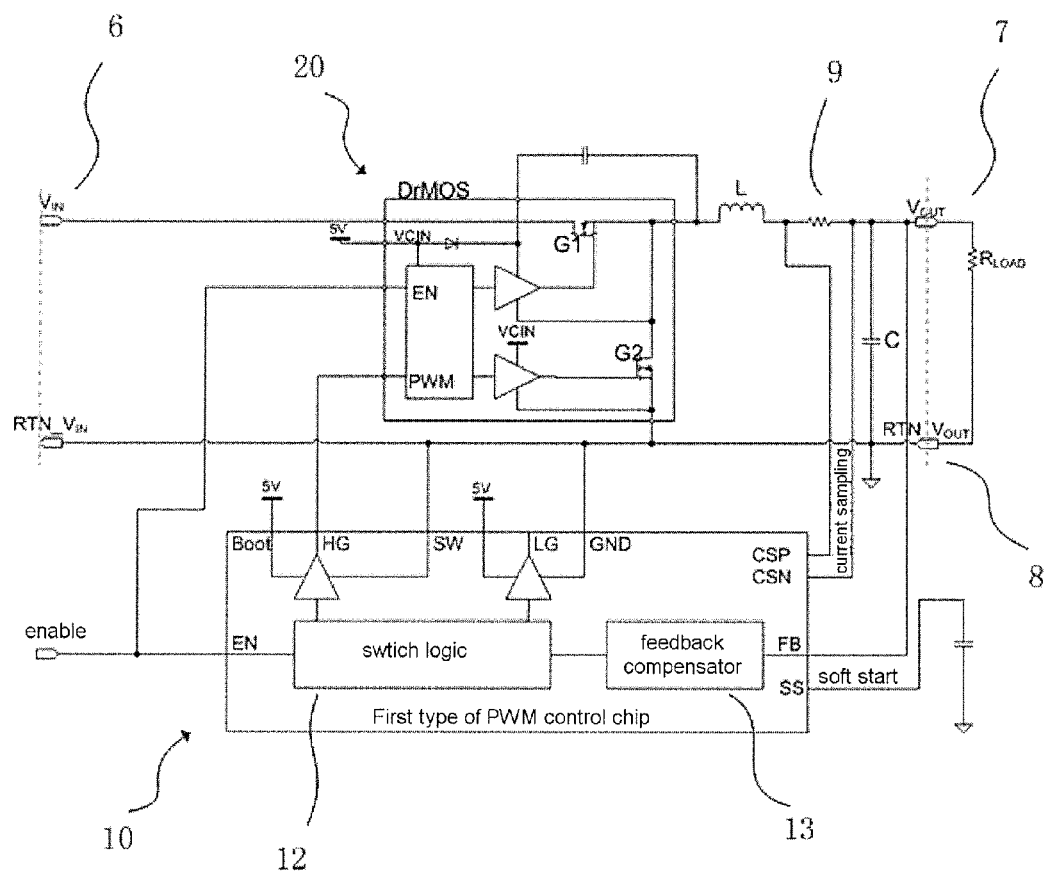
FIG. 4 is a diagram of a DC-DC Buck circuit according to an embodiment of the present invention, which is compatible with a DrMOS chip and a first type of PWM control chip and can output a relatively high voltage.

According to one embodiment of the present invention, a DC-DC Buck circuit is provided; FIG. 4 shows a circuit diagram of this DC-DC Buck circuit. The circuit comprises: a DC input terminal 6, a DC output terminal 7, a ground terminal 8, an inductor L, a capacitor C, a sampling resistor 9, an upper tube switch G1 and lower tube switch G2, a drive circuit and a PWM control circuit. The inductor L is located between the DC input terminal 6 and the DC output terminal 7; the capacitor C is located between the DC output terminal 7 and the ground terminal 8; the sampling resistor is located between the inductor L and the DC output terminal.

The upper tube switch G1, lower tube switch G2 and the drive circuit are formed as a DrMOS chip 20. The upper tube switch G1 is used for establishing or stopping conduction between the DC input terminal 6 and the inductor L, the lower tube switch G2 is used for the flyback current of the circuit, and the drive circuit is used for driving the upper tube switch G1 and lower tube switch G2 alternately according to a PWM control signal. The DrMOS chip 20 is located between the inductor L and the DC input terminal 6, and has a PWM pin which is used to receive the PWM control signal.

Figure 1:
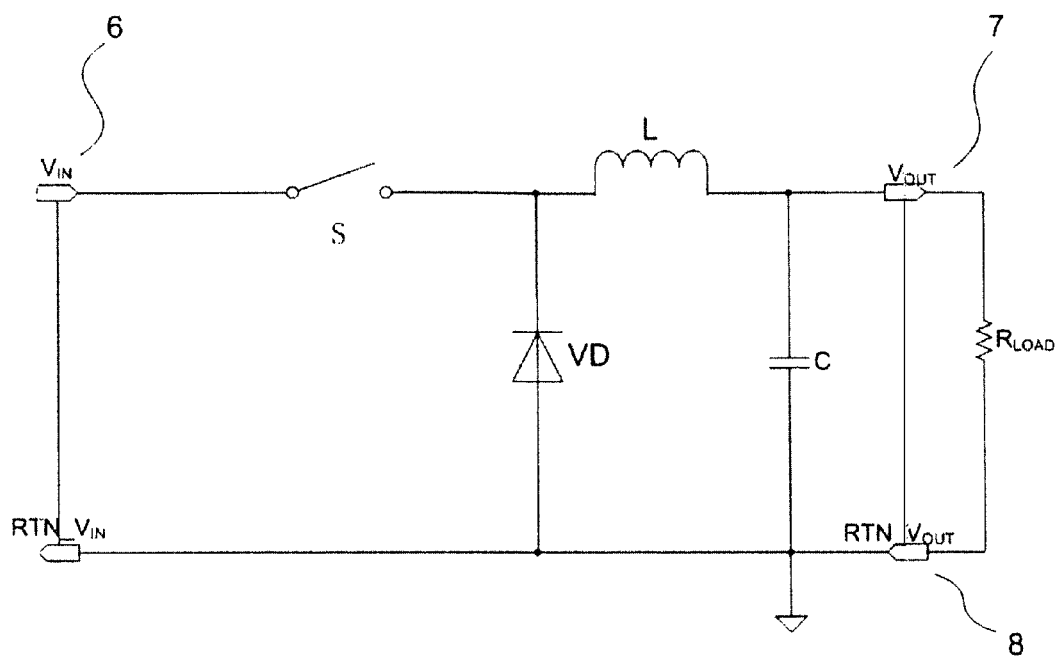
FIG. 1 is a diagram of a typical asynchronous DC-DC Buck circuit.
Figure 2:
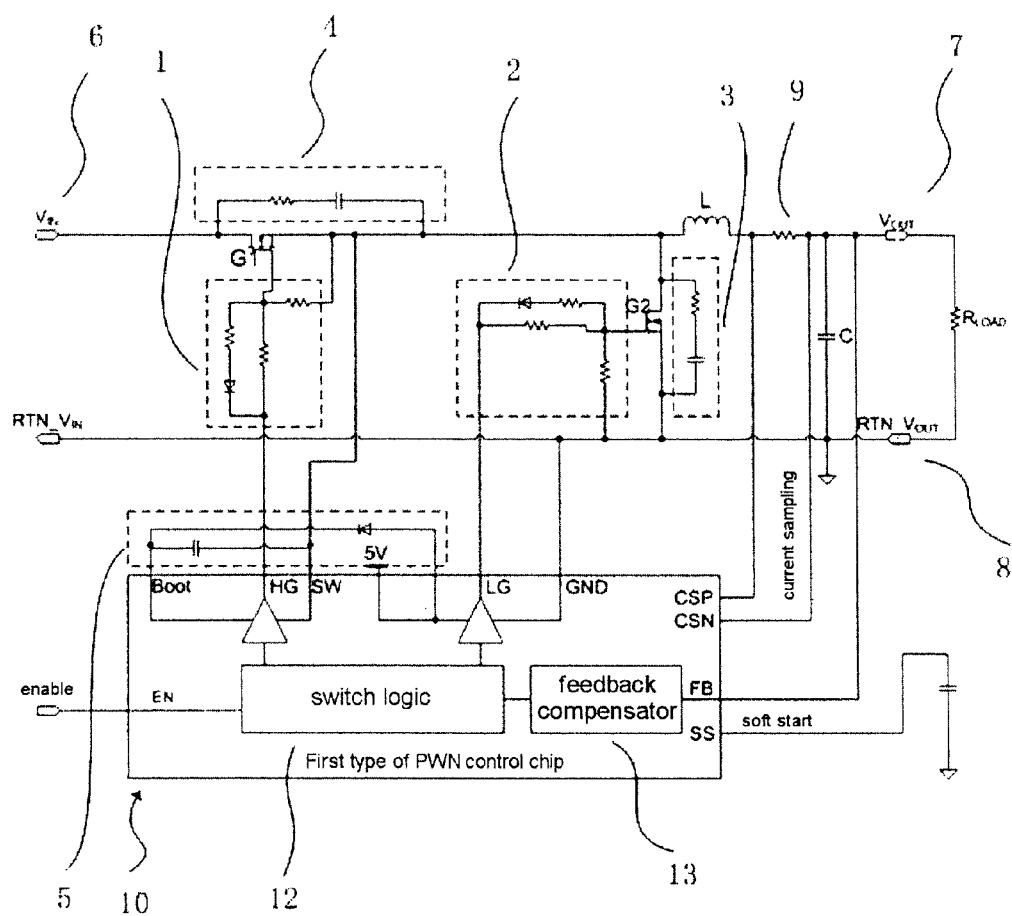
FIG. 2 is a diagram of a conventional synchronous DC-DC Buck circuit comprising a first type of PWM control chip which is compatible with external discrete switches.
Figure 3:
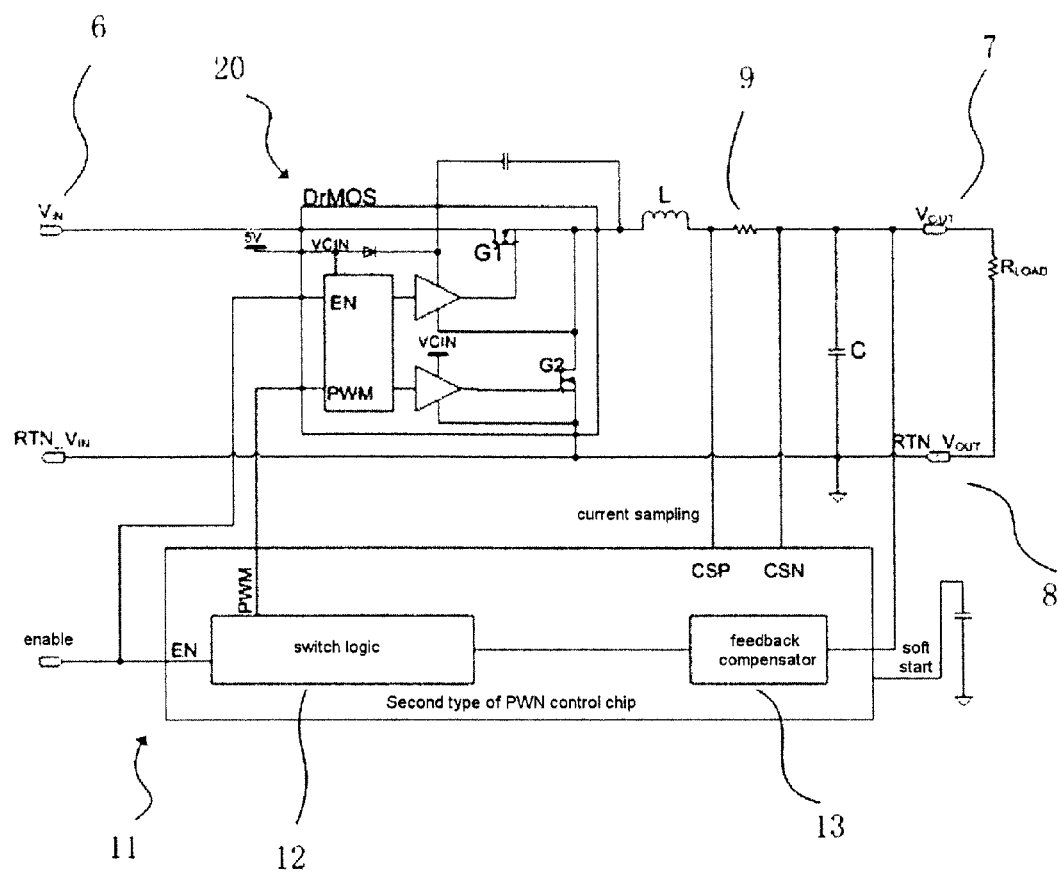
FIG. 3 is a diagram of a common DC-DC Buck circuit comprising a second type of PWM control chip which is compatible with a DrMOS chip.

The PWM control circuit is formed as a PWM control chip, which is used to supply the PWM control signal to the drive circuit. The PWM control chip has an internal upper tube driver HG and lower tube driver LG, which drive the upper tube switch G1 and lower tube switch G2. In one embodiment, the PWM control chip was originally designed to cooperate with external discrete switches, i.e. the first type of PWM control chip 10 shown in FIG. 2. The pins of this first type of PWM control chip 10 were set in such a way that the output of the PWM control signal was unrelated to the level of the switching node of the circuit, wherein the switching node is the node between the upper tube switch G1 and the inductor L. Here, since the PWM control chip 10 only supplies one control signal to the DrMOS chip 20, not needing to supply power to the drive circuit of the upper tube switch G1, the BOOT and SW pins for ensuring that the upper tube driver drove the upper tube switch in a floating manner in the original design no longer need to take into account the level of the switching node (as was required previously), so that the output of the PWM control signal is unrelated to the level of the switching node of the circuit. In addition, the output of the pin of the driver (including HG and LG) is also unrelated to the voltage at the node between the inductor and the sampling resistor, i.e. the voltage value received by the CSP. In the DC-DC Buck circuit provided by the present invention, the PWM control signal outputted by the PWM control chip 10 has the same function as the logic level outputted by the second type of PWM control chip 11 mentioned above which is specially intended to cooperate with a DrMOS chip 20. In addition, the PWM control chip also comprises switch logic 12 and a feedback compensator 13.

In the DC-DC Buck circuit provided by the present invention, the PWM control chip 10 can adjust the output of the PWM control signal according to feedback voltage and feedback current from the sampling resistor 9. The CSP pin and CSN pin of the PWM control chip are connected to the two ends of the sampling resistor 9, while the FB pin of the PWM control chip 10 is used to monitor the output voltage of the circuit. In the DC-DC Buck circuit provided by the present invention, since the PWM controller used is the first type of PWM control chip 10 shown in FIG. 2, and the CSP pin of this type of PWM control chip 10 is able to receive a higher voltage than the second type of PWM control chip 10, or is even not subject to level restrictions, the voltage at the node between the inductor and sampling resistor will not affect the output of the pin of the driver (including HG and LG). Therefore the DC-DC Buck circuit provided by the present invention is able to supply a larger output voltage than existing DC-DC Buck circuits, in which a DrMOS chip 20 and the second type of PWM control chip 11 are integrated.

The pins of the PWM control chip 10 include a BOOT pin for supplying a bootstrap voltage and an SW pin for forming an upper tube drive signal loop. A predetermined voltage difference is set between these two pins, so that the upper tube driver HG outputs a PWM control signal, which is used to enable the drive circuit to drive the upper tube switch G1 and lower tube switch G2 alternately. In one embodiment, a DC voltage of 5 V is supplied to the BOOT pin, while the SW pin is connected to the ground terminal, to enable the upper tube driver HG to output a control signal. The way in which the lower tube driver LG of the PWM control chip 10 provided by the present invention is connected to the external circuit is different from that shown in FIG. 2; the lower tube driver LG of the PWM control chip 10 provided by the present invention does not need to supply a PWM control signal to the external circuit. In addition, the BOOT pin and SW pin of the PWM control chip 10 provided by the present invention cannot be connected to the external circuit in the manner shown in FIG. 2 either; this is because the reference ground for the control signal emitted by the upper tube driver HG must be the same as the reference ground of the DrMOS chip 20.

Apart from the upper tube driver HG, the lower tube driver LG of the first type of PWM control chip 10 can also be used to supply a PWM control signal. According to one embodiment of the present invention, a circuit including the above-mentioned DC-DC Buck circuit and a phase inverter is provided. The phase inverter is connected to the lower tube driver LG of the PWM control chip 10 to output a PWM control signal, which is used to enable the drive circuit to drive the upper tube switch G1 and the lower tube switch G2 alternately. In this case, the upper tube driver HG no longer supplies the PWM control signal.

The PWM control chip provided by the present invention (i.e. the first type of PWM control chip 10) may for example be an LTC3855 produced by Linear, or a TPS40140 produced by Texas Instruments. The DrMOS chip may be an FDMF6707V produced by Fairchild, or a TDA21220 produced by Infineon.

In the DC-DC Buck circuit provided by the present invention, the upper tube switch G1 and lower tube switch G2 may for example be MOSFETs or bipolar junction transistors.

Figure 5:
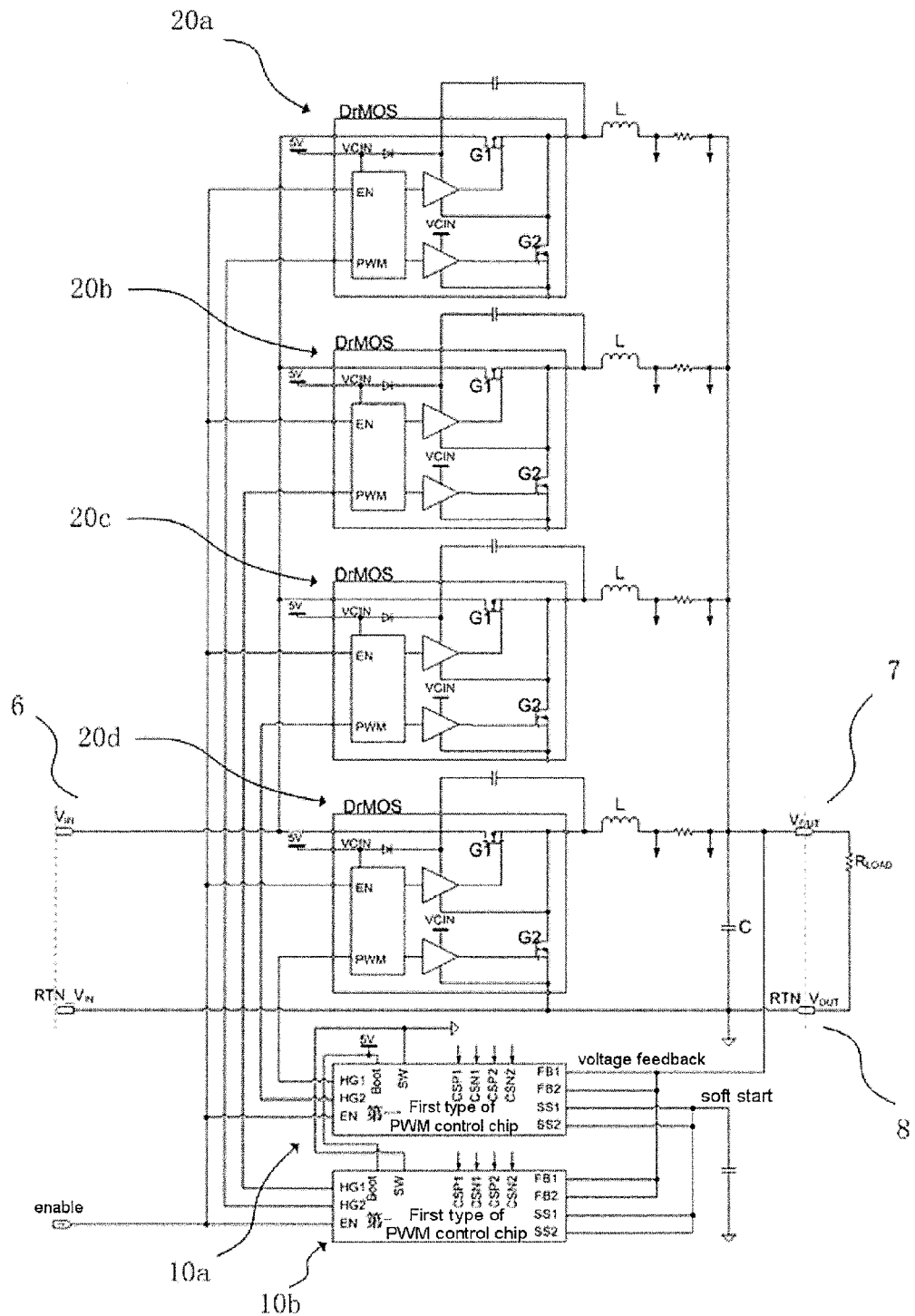
FIG. 5 is a diagram of a four-phase Buck circuit according to an embodiment of the present invention, wherein the four-phase Buck circuit comprises four of the DC-DC Buck circuits provided by the present invention, connected in parallel.

According to one embodiment of the present invention, a multiphase DC-DC Buck circuit interleaved in parallel is provided, formed by connecting N of the DC-DC Buck circuits described above in parallel, wherein the phase difference between the PWM control signals output by the PWM control chip is 360/N degrees. The multiphase DC-DC Buck circuit interleaved in parallel can be used to increase power density and to reduce ripple waves in the output current. FIG. 5 shows a four-phase Buck circuit comprising four DrMOS chips 20a-20d and PWM control chips 10a-10b cooperating therewith, wherein the PWM control chips 10a and 10b each have two independent Buck circuit control units, and can each supply two independent PWM control signal outputs. For an input of 12 V, this circuit can supply a voltage of up to 8 V, and is simpler than conventional four-phase Buck circuits.

According to one embodiment of the present invention, a power supply allocation device is provided, comprising the DC-DC Buck circuit described above. According to one embodiment of the present invention, a magnetic resonance imaging system is further provided, comprising the above power supply allocation device.

It should be understood that although this Description describes the present invention according to various embodiments, it is by no means the case that each embodiment includes just one independent technical solution. The Description is written in this way purely for the sake of clarity. Those skilled in the art should take the Description as a whole; the technical solutions in the various embodiments could also be suitably combined to form other embodiments which those skilled in the art could appreciate.

The embodiments described above are merely specific schematic embodiments of the present invention, and are by no means intended to limit the scope thereof. Any equivalent changes, modifications or combinations made by those skilled in the art without departing from the concept and principles of the present invention should fall within the scope of protection thereof.

I claim as my invention:

1. A DC-DC Buck circuit, comprising:
a DC input terminal;
a DC output terminal;
a ground terminal;
an inductor between the DC input terminal and the DC output terminal;
a capacitor between the DC output terminal and the ground terminal;
a sampling resistor between the inductor and the DC output terminal;
a PWM control chip, comprising at least one driver pin that supplies a PWM control signal and said PWM control chip further comprising a BOOT pin that supplies a bootstrap voltage, and an SW pin that forms a driver loop, with a predetermined voltage difference between the BOOT pin and the SW pin;
a DrMOS chip between the inductor and the DC input terminal, configured to drive conduction between the DC output terminal and the DC input terminal, and between the DC output terminal and the capacitor, or according to the PWM control signal, the DrMOS chip comprising a PWM pin that receives the PWM control signal; and
the output of the driver pin being unrelated to the voltage between the inductor and the sampling resistor.

2. The Buck circuit as claimed in claim 1 wherein the BOOT pin is connected to a 5-volt DC voltage, while the SW pin is connected to the ground terminal.

3. The Buck circuit as claimed in claim 1, wherein the driver pin comprises at least one upper tube driver pin and at least one lower tube driver pin, and the PWM control signals supplied by the upper tube driver pin and the lower tube driver pin (LG) have opposite phases.

4. The Buck circuit as claimed in claim 3, wherein the upper tube driver pin is connected to the PWM pin.

5. The Buck circuit as claimed in claim 3, wherein the lower tube driver pin is connected to the PWM pin, and the Buck circuit further comprises a phase inverter connected between the lower tube driver pin and the PWM pin.

6. A multiphase DC-DC Buck circuit comprising:
- a plurality N of Buck circuits interleaved in parallel with each other;
- each of said N buck circuits comprising:
  - a DC input terminal;
  - a DC output terminal;
  - a ground terminal;
  - an inductor between the DC input terminal and the DC output terminal;
  - a capacitor between the DC output terminal and the ground terminal;
  - a sampling resistor between the inductor and the DC output terminal;
  - a PWM control chip, comprising at least one driver pin that supplies a PWM control signal, and said PWM control chip further comprising a BOOT pin that supplies a bootstrap voltage, and an SW pin that forms a driver loop, with a predetermined voltage difference between the BOOT pin and the SW pin;
  - a DrMOS chip between the inductor and the DC input terminal, configured to drive conduction between the DC output terminal and the DC input terminal, and between the DC output terminal and the capacitor, or according to the PWM control signal, the DrMOS chip comprising a PWM pin that receives the PWM control signal; and
  - the output of the driver pin being unrelated to the voltage between the inductor and the sampling resistor.

7. The Buck circuit as claimed in claim 6, wherein a phase difference between the PWM control signals emitted by the respective PWM control chips of the N Buck circuits is 360/N degrees.

* * * * *